L. D. TREDWAY.
Swill or Slop Vault for Sewers.

No. 121,219.  Patented Nov. 21, 1871.

Witnesses:

Inventor:
Louis D. Tredway
by his Attorneys

UNITED STATES PATENT OFFICE.

LOUIS D. TREDWAY, OF ST. LOUIS, MISSOURI.

IMPROVEMENT IN VAULTS FOR SEWERS.

Specification forming part of Letters Patent No. 121,219, dated November 21, 1871.

*To all whom it may concern:*

Be it known that I, LOUIS D. TREDWAY, of the city and county of St. Louis and State of Missouri, have invented a certain new and useful Improvement, being a Swill or Slop Vault for Sewers; and I do hereby declare that the following is a full, clear, and exact description thereof, reference being had to the accompanying drawing of the same, which makes a part of this specification, and in which—

Figure 1:
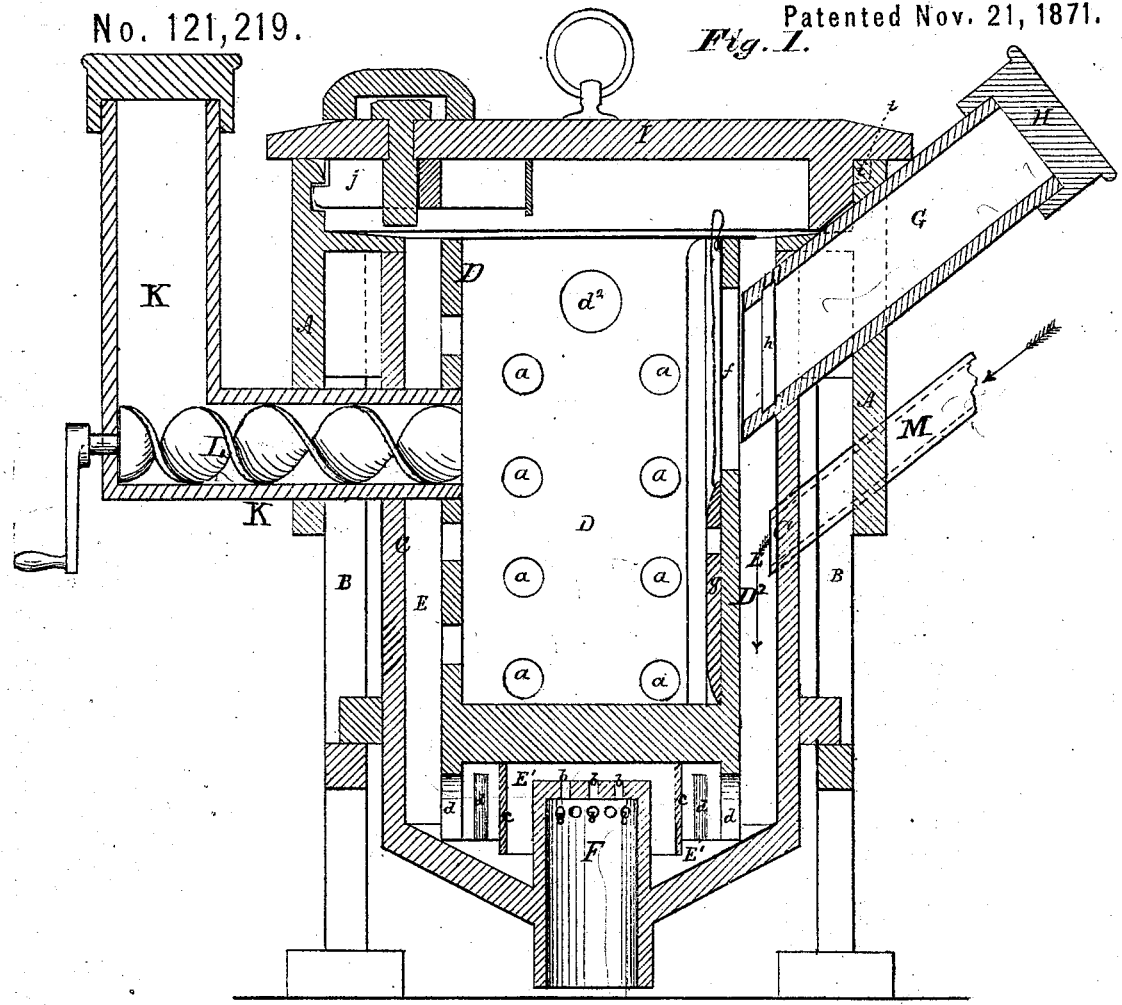
Figure 2:
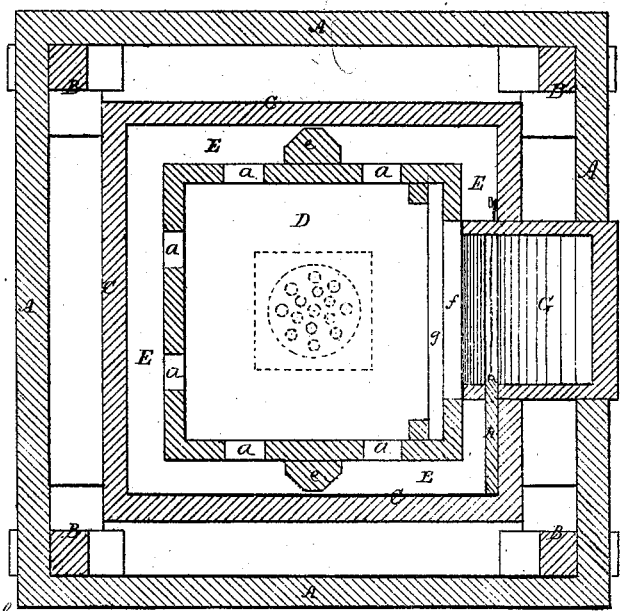

Figure 1 represents a vertical section of a slop-sewer vault embracing my invention, and Fig. 2 a horizontal section of the same.

My invention relates to the employment of air-tight swill or slop vaults in connection with street-sewers for the purpose of collecting the solid or vegetable matter of the slop while the liquid portion passes off into the sewer, the vault being located at such places contiguous to dwellings as to allow of their connection with the yards thereof, or of convenient access in alleys. The vault, although being intended to form a direct connection with the yard or dwelling, may be used as well in the sidewalk or street, where there is no convenient alley connecting with the yard. The swill-tank or vault is placed in an excavation in an alley or street, close to the fence or wall, so that the cover thereof will be on a level with the surface of the pavement. It consists of three principal parts, viz.: an outer supporting wooden frame or case; a fixed vessel, of wood, iron, or earthenware, as may be desired; and an interior removable receiving-vessel, of wood or vulcanized iron, to resist the action of the acid matter which it is intended to receive.

The outer case A is supported by an open frame, B, the uprights of which may rest upon stone feet to prevent it from sinking. This frame B also supports within it and the open frame the fixed vessel, within and upon the inclined bottom of which the removable vessel D for the reception of the swill or slop is supported so as to leave a space or chamber, E, entirely around it, into which the fluid passes from the vessel D through openings $a$ therein in three of its sides, and from which it passes through the stench-trap F into the sewer. The stench-trap F is located within a chamber, E', between the bottom of the fixed and of the removable vessels, as shown in Fig. 1. Said stench-trap consists of a pipe of suitable size rising from the bottom of the fixed vessel, and having small openings $b$ in it, which communicate with the fluid-chamber E', and as it forms a direct connection with the sewer by means of a pipe, G, it also puts the sewer in direct connection with the fluid-chamber. The stench-trap rises above the bottom of its chamber to near the bottom of the portable vessel, and a flange, $c$, projects from the latter so as to partially inclose the trap, but leaving openings between them and the bottom of the chamber E', and thus completing the trap without interfering with the passage of the fluid therefrom. The sides of the portable vessel rest upon the inclined bottom of the fixed vessel, and are provided with openings $d$, through which the lower receiving-chamber E' of the stench-trap communicates with the vertical chamber E which surrounds the portable vessel. While the fluids, therefore, pass out of the portable receiver and through the stench-trap into the sewer without the least liability of choking the latter, the solids are retained in the central vessel, which may be lifted out and emptied by the scavenger at pleasure, being provided for this purpose with hand-holes $d^2$ or handles, and vertical ribs $e$ to steady it in its removal and replacement. One side of this portable vessel is provided with an opening, $f$, into which leads a pipe or trough, G, which passes through the wall or fence from the adjoining yard. This pipe is inclined, and placed in such a position as to be easy of access, and its entrance has an air-tight door or cover, H. The opening $f$ in the swill-receiver is closed by a slide-door, $g$, when the vessel is lifted out to empty the contents over the closed sides. The inner end of the spout or trough is also provided with a slide-door, $h$, for closing the entrance of the spout when the receiving-vessel is removed. The outer supporting-box is provided with an iron cover, I, which may have rubber bearings to prevent the escape of the gases or odor from the slops; and also locked to the frame on one side by lugs $i$ and a spring-bolt, $j$, or other device on the other side, which may be secured in any suitable manner against unwarranted interference.

If it should be found desirable a drainage-pipe from the yard may form a connection with the surrounding chamber of the slop-vessel.

In case it should be found desirable the swill-vault may be connected with a privy in such manner as to carry off through it all the fluids from the swill-conduits instead of through the sewer.

When access to the yard or wall is inconvenient a conveying-screw, L, worked by a crank and gearing, is used to carry or conduct the garbage or swill on a horizontal line from any point in the yard to the receiving-vessel, as shown in Fig. 1.

The waste water from the sink, bath, or water-closet is let into the surrounding chamber of the vault by a separate pipe, M, so as to strike the solid back side $D^2$ of the removable receiving-vessel D near the bottom thereof, and at once pass out at the trap, and thus prevent it from entering the strainer, and preserving the garbage to feed stock. This could not be done if the water were allowed to enter the slop-vessel from the waste-pipe.

Having described my invention, I claim—

1. In a slop-vault, the combination of a removable receiving-vessel, D, with the conducting-trough K and hand discharging-screw L, as described.

2. The interior projecting flanges $c$ partially inclosing the stench-trap F, and the perforated sides $d$ upon and by which the receiving-vessel D is supported, both made removable with said vessel, and serving to protect the trap F from choking, as described.

3. The arrangement of the waste-water pipe M so as to enter the chamber E near the bottom of the receiving-vessel D and deliver the waste water against the solid side $D^2$ thereof, as and for the purpose described.

4. In a slop-vault, the combination of the removable receiving-vessel D with its inclosing and supporting flanges $c$ and open sides $d$, the conducting-trough G or K, hand discharging-screw I with the fixed vessel C and stench-trap F, the whole constructed and arranged as shown and described.

In testimony whereof I have hereunto set my hand.

LOUIS D. TREDWAY.

Witnesses:
A. J. BRIGGS,
N. S. SCHEABERGER. (51)